(12) United States Patent
Wang

(10) Patent No.: US 11,552,470 B2
(45) Date of Patent: Jan. 10, 2023

(54) ELECTROSTATIC DISCHARGE CIRCUIT

(71) Applicants: Semiconductor Manufacturing International (ShenZhen) Corporation, Shenzhen (CN); Semiconductor Manufacturing International (Shanghai) Corporation, Shanghai (CN)

(72) Inventor: Jue Wang, Shanghai (CN)

(73) Assignees: Semiconductor Manufacturing International (ShenZhen) Corporation, ShenZhen (CN); Semiconductor Manufacturing International (Shanghai) Corporation, Shanghai (CN)

( * ) Notice: Subject to any disclaimer, the term of this patent is extended or adjusted under 35 U.S.C. 154(b) by 0 days.

(21) Appl. No.: 17/447,885

(22) Filed: Sep. 16, 2021

(65) Prior Publication Data

US 2022/0102970 A1 Mar. 31, 2022

(30) Foreign Application Priority Data

Sep. 30, 2020 (CN) .......................... 202011056506.6

(51) Int. Cl.
*H02H 9/04* (2006.01)
(52) U.S. Cl.
CPC .................................. *H02H 9/046* (2013.01)
(58) Field of Classification Search
CPC ..................................................... H02H 9/046
USPC ........................................................... 361/56
See application file for complete search history.

(56) References Cited

U.S. PATENT DOCUMENTS

| | | | | |
|---|---|---|---|---|
| 10,177,137 | B1* | 1/2019 | Altolaguirre | H01L 27/0288 |
| 2011/0194218 | A1* | 8/2011 | Chen | H02H 9/046 |
| | | | | 361/56 |
| 2013/0027820 | A1* | 1/2013 | Padilla | H02H 9/046 |
| | | | | 361/56 |
| 2013/0050885 | A1* | 2/2013 | Chen | H02H 9/04 |
| | | | | 361/56 |
| 2019/0006842 | A1* | 1/2019 | Watanabe | H02H 9/046 |
| 2019/0097420 | A1* | 3/2019 | Chen | H03K 17/0822 |

* cited by examiner

*Primary Examiner* — Dharti H Patel
(74) *Attorney, Agent, or Firm* — Anova Law Group, PLLC

(57) ABSTRACT

An electrostatic discharge circuit includes six transistors. A power supply voltage node is coupled with a gate and a drain of a first transistor and connected to a source of a second transistor and a drain of a fifth transistor. A source of the first transistor is coupled to a ground voltage node and connected to a gate of a third transistor and a gate of a fourth transistor. A gate of the second transistor is connected to the drain of the first transistor. A source of the third transistor is connected to the drain of the second transistor and a gate of the fifth transistor. A drain of the fourth transistor is connected to a drain of the third transistor. A source of the fourth transistor and a source of the sixth transistor are connected to the ground voltage node.

20 Claims, 3 Drawing Sheets

ELECTROSTATIC DISCHARGE CIRCUIT

CROSS-REFERENCE TO RELATED APPLICATION

This application claims priority to Chinese Patent Application No. 202011056506.6, filed Sep. 30, 2020, the entire content of which is incorporated herein by reference.

TECHNICAL FIELD

The present disclosure relates to the field of integrated circuits and, in particular, to an electrostatic discharge circuit.

BACKGROUND

Electrostatic discharge (ESD) is a problem in the electronics industry that requires a long-term improvement in technology.

Common electrostatic discharge models include human body model (HBM), machine model (MM), and charged device model (CDM). In the HBM, a human body with charges discharges to a device, causing damage to the device. In the MM, a charged device discharges to the device, causing damage to the device. In the CDM, the charged device discharges directly to the ground. A discharge time of the charged device model is relatively fast, which is less than 10 ns. Thus, a relatively fast electrostatic discharge protection circuit is needed to quickly respond to the electrostatic phenomenon and discharge the electrostatic current in time.

However, a response time of existing electrostatic discharge protection circuit is relatively long, and a response speed of the electrostatic discharge protection circuit needs to be improved.

SUMMARY

The technical problem solved by the present disclosure is to provide an electrostatic discharge circuit to improve a response speed of the electrostatic discharge protection circuit.

To solve the above technical problem, the technical solution of the present disclosure provides an electrostatic discharge circuit, including a first transistor, a second transistor, a third transistor, a fourth transistor, a fifth transistor, and a sixth transistor. A gate of the first transistor is coupled to a power supply voltage node. A drain of the first transistor is coupled to the power supply voltage node. A source of the first transistor is coupled to a ground voltage node. A gate of the second transistor is connected to the drain of the first transistor. A source of the second transistor is connected to the power supply voltage node. A gate of the third transistor and a gate of the fourth transistor are connected to the source of the first transistor. A drain of the third transistor is connected to a drain of the fourth transistor. A source of the third transistor is connected to the drain of the second transistor. A source of the fourth transistor is connected to the ground voltage node. A gate of the fifth transistor is connected to the source of the third transistor and the drain of the second transistor. A drain of the fifth transistor is connected to the power supply voltage node. A gate of the sixth transistor is connected to the gate of the third transistor and the drain of the fourth transistor. A drain of the sixth transistor is connected to the source of the fifth transistor. A source of the sixth transistor is connected to the ground voltage node.

Optionally, the gate of the fifth transistor is also coupled to the power supply voltage node.

Optionally, the electrostatic discharge circuit further includes a first capacitor. One end of the first capacitor is connected to the power supply voltage node, another end of the first capacitor is connected to the gate of the first transistor.

Optionally, the electrostatic discharge circuit further includes a first resistor. One end of the first resistor is connected to the power supply voltage node, another end of the first resistor is connected to the drain of the first transistor.

Optionally, the electrostatic discharge circuit further includes a second resistor. One end of the second resistor is connected to the first capacitor, another end of the second resistor is connected to the gate of the third transistor and the gate of the fourth transistor.

Optionally, the electrostatic discharge circuit further includes a second capacitor. One end of the second capacitor is connected to the ground voltage node, another end of the second capacitor is connected to the second resistor.

Optionally, the first transistor includes an N-type transistor. The second transistor includes a P-type transistor. The third transistor includes the P-type transistor. The fourth transistor includes the N-type transistor. The fifth transistor includes the N-type transistor. The sixth transistor includes the N-type transistor.

Optionally, a threshold voltage range of the first transistor is 0.5V to 1V. A threshold voltage range of the second transistor is 0.5V to 1V. A threshold voltage range of the third transistor is 0.5V to 1V. A threshold voltage range of the fourth transistor is 0.5V to 1V. A threshold voltage range of the fifth transistor is 0.5V to 1V. A threshold voltage range of the sixth transistor is 0.5V to 1V.

Optionally, the power supply voltage node is an electrostatic input terminal. The ground node is an electrostatic output terminal.

Compared with the existed technology, the technical solution of the present disclosure has the following beneficial effects.

In the electrostatic discharge circuit in the technical solution of the present disclosure, the first transistor, the second transistor, the fifth transistor, and the power supply voltage node form a loop. The first transistor, the third transistor, the sixth transistor, and the ground voltage node form a loop. The two loops can be paralleled to conduct the fifth transistor and the sixth transistor, to enable electrostatic charges to be discharged at the ground voltage node. The two loops can be paralleled to conduct the fifth transistor and the sixth transistor, therefore, a response time of the fifth transistor and the sixth transistor can be shortened, a conduction speed of the electrostatic discharge circuit can be relatively fast, and the electrostatic discharge performance can be improved. In addition, the two loops can be paralleled, therefore an on-resistance of the electrostatic discharge circuit can be relatively small, a voltage drop of the electrostatic discharge circuit can be relatively small, and the fifth transistor and the sixth transistor can be conducted relatively fully, to increase a discharge capacity of the electrostatic discharge circuit.

Further, the electrostatic discharge circuit further includes the first capacitor connected to the power supply voltage node and the gate of the first transistor, the first resistor connected to the power supply voltage node and the drain of the first transistor, the second resistor connected to the first capacitor, and the second capacitor connected to the ground voltage node. The source of the first transistor is connected to the second resistor and the second capacitor. Therefore, conduction of each of the two parallel loops only has a response time of one RC. Thus, the response speed of the electrostatic discharge circuit can be relatively fast, the on-resistance of the electrostatic discharge circuit can be relatively small, and the discharge capacity of the electrostatic discharge circuit can be increased, thereby improving the electrostatic discharge performance.

Further, the gate of the fifth transistor is also coupled with the power supply voltage node, to cause the fifth transistor to be conducted by the voltage of the power supply voltage node, thereby shortening the conduction time of the fifth transistor, and improving the conduction efficiency of the electrostatic discharge circuit.

Further, the first transistor includes the N-type transistor, the second transistor includes the P-type transistor, the third transistor includes the P-type transistor, the fourth transistor includes the N-type transistor, the fifth transistor includes the N-type transistor, and the sixth transistor includes the N-type transistor. Therefore, after the electrostatic charges are input at the power supply voltage node, the first transistor is loaded with a high-level voltage to enable the first transistor to be conducted first. After the first transistor is conducted, the second transistor and the third transistor are connected a low-level voltage of the ground voltage node to enable the second transistor and the third transistor to be conducted. After the second transistor and the third transistor are conducted, the fifth transistor and the sixth transistor are connected to the high-level voltage of the power supply voltage node to enable the fifth transistor and the sixth transistor to be conducted. After the fifth transistor and the sixth transistor are conducted, the electrostatic charges discharged at the ground voltage node.

DETAILED DESCRIPTION OF THE EMBODIMENTS

As described in the background, the response time of the existed electrostatic discharge protection circuit is relatively long. The analysis and description are combined with specific embodiments below.

Figure 1:
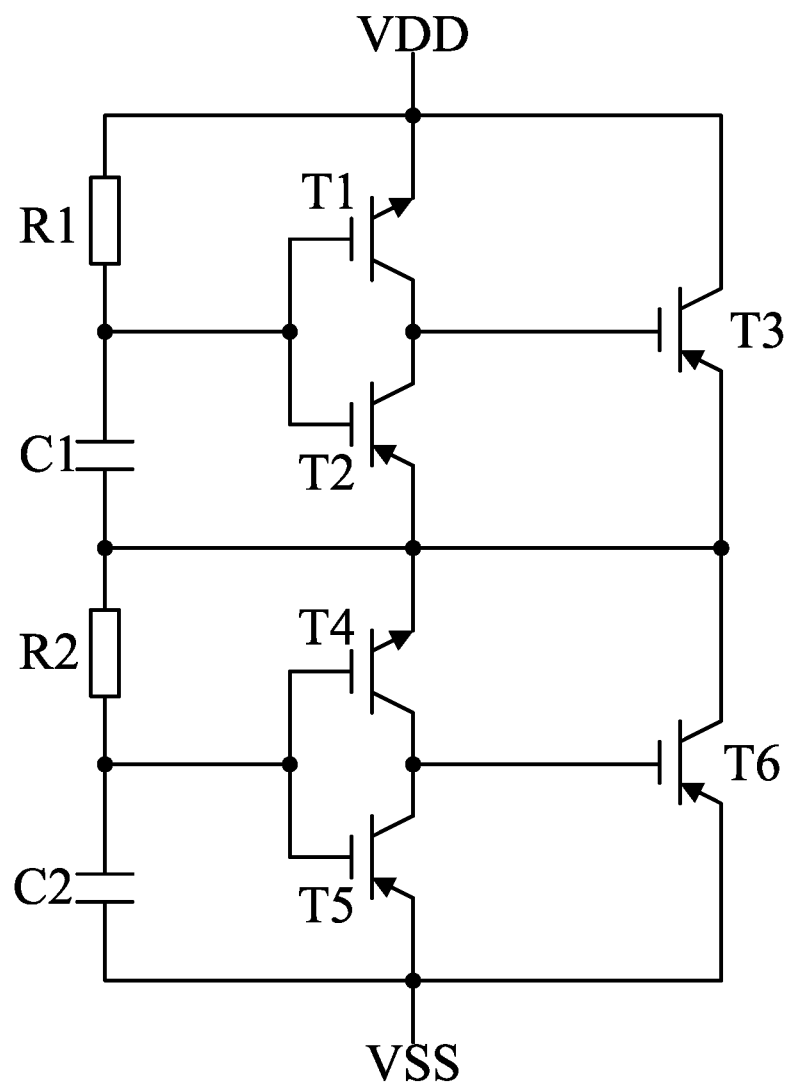
FIG. 1 is a schematic diagram of an electrostatic discharge circuit according to an example embodiment of the present disclosure.

FIG. 1 is a schematic diagram of an electrostatic discharge circuit according to an example embodiment of the present disclosure.

As shown in FIG. 1, the electrostatic discharge circuit includes a first transistor T1, a second transistor T2, a third transistor T3, a fourth transistor T4, a fifth transistor T5, a sixth transistor T6, a first resistor R1 and a first capacitor C1 connected to a power supply voltage node VDD, and a second resistor R2 and a second capacitor C2 connected to the first capacitor C1. A gate of the first transistor T1 and a gate of the second transistor T2 are coupled to the power supply voltage node VDD. A source of the first transistor T1 is connected to the power supply voltage node VDD. A drain of the second transistor T2 is connected to a drain of the first transistor T1. A gate of the third transistor T3 is connected to the drain of the second transistor T2 and the drain of the first transistor T1. A drain of the third transistor T3 is connected to the power supply voltage node VDD. A source of the third transistor T3 is connected to the source of the second transistor T2. The gate of the first transistor T1 and the gate of the second transistor T2 are connected to the first resistor R1 and the first capacitor C1. The source of the second transistor T2 is connected to the first capacitor C1. A source of the fourth transistor T4 is connected to the source of the second transistor T2. A drain of the fifth transistor T5 is connected to a drain of the fourth transistor T4. A source of the fifth transistor T5 is connected to a ground voltage node VSS. A gate of the sixth transistor T6 is connected to the drain of the fifth transistor T5 and the drain of the fourth transistor T4. A drain of the sixth transistor T6 is connected to the source of the third transistor T3. A source of the sixth transistor T6 is connected to the ground voltage node VSS. The second capacitor C2 is connected to the ground voltage node VSS. A gate of the fourth transistor T4 and a gate of the fifth transistor T5 are connected to the second resistor R2 and the second capacitor C2.

In the electrostatic discharge circuit, the first transistor T1 and the second transistor T2 constitute an inverter. The fourth transistor T4 and the fifth transistor T5 constitute an inverter. The first transistor T1 includes a P-type transistor. The second transistor T2 includes an N-type transistor. The fourth transistor T4 includes the P-type transistor. The fifth transistor T5 includes the N-type transistor. The third transistor T3 includes the N-type transistor. The sixth transistor T6 includes the N-type transistor. After electrostatic charges are input at the power voltage node VDD, the third transistor T3 and the sixth transistor T6 are conducted to discharge the electrostatic charges at the ground voltage node VSS.

In the electrostatic discharge circuit, the first transistor T1, the third transistor T3, and the power supply voltage node VDD form a loop. The fourth transistor T4, the sixth transistor T6, and the ground voltage node VSS form a loop. The first transistor T1 and the third transistor T3 need to be conducted before conducting the fourth transistor T4 and the sixth transistor T6. Conducting the first transistor T1 and the third transistor T3 requires a response time of R1C1. Conducting the fourth transistor T4 and the sixth transistor T6 requires a response time of R2C2. Therefore, a sum of the response time of R1C1 and the response time of R2C2 is required to conduct the third transistor T3 and sixth transistor T6. The response time is relatively long, which is not suitable for the electrostatic discharge model with a relatively short discharge time, such as the CDM, thereby causing the electrostatic current to not be discharged in time and damaging the device.

To solve the above problems, the technical solution of the present disclosure provides another electrostatic discharge circuit. The first transistor, the second transistor, and the fifth transistor form a loop with the power supply voltage node. The first transistor, the third transistor, and the sixth transistor form a loop with the ground voltage node. The two loops can be paralleled to conduct the fifth transistor and the sixth transistor, to enable the electrostatic charges to be discharged at the ground voltage node. The two loops can be in paralleled to conduct the fifth transistor and the sixth transistor. Therefore, the response time of the fifth transistor and the sixth transistor is shortened, the conduction speed of the electrostatic discharge circuit is increased, and the electrostatic discharge performance can be improved.

To achieve the above objectives, features, and beneficial effects of the present disclosure more obvious and understandable, specific embodiments of the present disclosure will be described in detail below with reference to the drawings.

Figure 2:
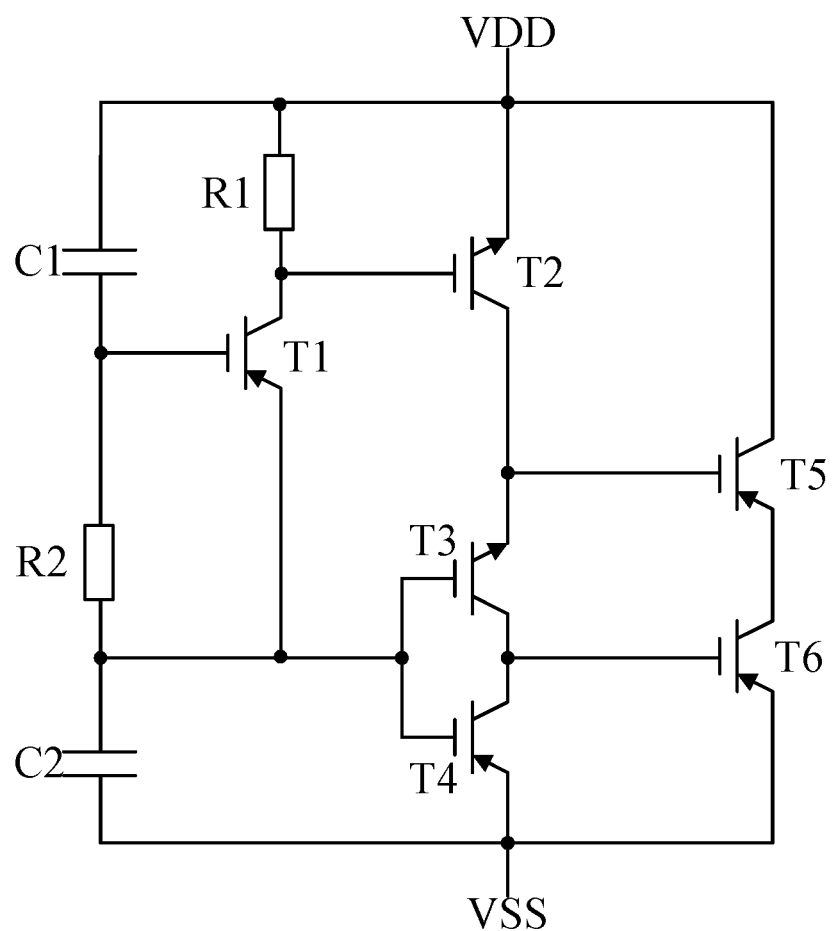
FIG. 2 is a schematic diagram of an electrostatic discharge circuit according to an example embodiment of the present disclosure.

FIG. 2 is a schematic diagram of an electrostatic discharge circuit according to an example embodiment of the present disclosure.

As shown in FIG. 2, the electrostatic discharge circuit includes a first transistor T1, a second transistor T2, a third transistor T3, a fourth transistor T4, a fifth transistor T5, and a sixth transistor T6.

A gate of the first transistor T1 is coupled to a power supply voltage node VDD. A drain of the first transistor T1 is coupled to the power supply voltage node VDD. A source of the first transistor T1 is coupled to a ground voltage node VSS.

A gate of the second transistor T2 is connected to the drain of the first transistor T1. A source of the second transistor T2 is connected to the power supply voltage node VDD.

A gate of the third transistor T3 and a gate of the fourth transistor T4 are connected to the source of the first transistor T1. A drain of the third transistor T3 is connected to a drain of the fourth transistor T4. A source of the third transistor T3 is connected to the drain of the second transistor T2. A source of the fourth transistor T4 is connected to the ground voltage node VSS.

The third transistor T3 and the fourth transistor T4 constitute an inverter. In an example embodiment, the fourth transistor T4 functions as a stabilizing circuit, to enable the electrostatic discharge circuit to be conducted in a case with a non-electrostatic input, thereby preventing the entire circuit from leaking.

A gate of the fifth transistor T5 is connected to the source of the third transistor T3 and the drain of the second transistor T2. A drain of the fifth transistor T5 is connected to the power supply voltage node VDD.

A gate of the sixth transistor T6 is connected to the drain of the third transistor T3 and the drain of the fourth transistor T4. A drain of the sixth transistor T6 is connected to the fifth transistor T5. A source of the sixth transistor T6 is connected to the ground voltage node VSS.

In an example embodiment, the electrostatic discharge circuit further includes a first capacitor C1. One end of the first capacitor C1 is connected to the power supply voltage node VDD, another end of the first capacitor C1 is connected to the gate of the first transistor T1.

The first capacitor C1 is used to read a potential of the power supply voltage node VDD.

In an example embodiment, the electrostatic discharge circuit further includes a first resistor R1. One end of the first resistor R1 is connected to the power supply voltage node VDD, another end of the first resistor R1 is connected to the drain of the first transistor T1.

The first resistor R1 plays a protective role to prevent the first transistor T1 and the second transistor T2 from being easily broken down due to a relatively large voltage of the power supply voltage node VDD when the first transistor T1 and the second transistor T2 are directly connected to the power supply voltage node VDD.

The first transistor T1, the second transistor T2, and the fifth transistor T5 form a loop with the power supply voltage node VDD. The loop has a response time of the first resistor R1 and the first capacitor C1, that is, the response time of R1C1.

In an example embodiment, the electrostatic discharge circuit further includes a second resistor R2 and a second capacitor C2. One end of the second resistor R2 is connected to the first capacitor C1, another end of the second resistor R2 is connected to the gate of the third transistor T3 and the gate of the fourth transistor T4. One end of the second capacitor C2 is connected to the ground voltage node VSS, another end of the second capacitor C2 is connected to the second resistor R2.

The first transistor T1, the third transistor T3, and the sixth transistor T6 form a loop with the ground voltage node VSS. The loop has a response time of the second resistor R2 and the second capacitor C2, that is, the response time of R2C2.

In an example embodiment, the power supply voltage node VDD is an electrostatic input terminal. The electrostatic input terminal is used to input electrostatic charges generated by a device. The ground node VSS is an electrostatic output terminal. The electrostatic output terminal is grounded to discharge the electrostatic charges.

In an example embodiment, the first transistor T1 includes an N-type transistor. The second transistor T2 includes a P-type transistor. The third transistor T3 includes the P-type transistor. The fourth transistor T4 includes the N-type transistor. The fifth transistor T5 includes the N-type transistor. The sixth transistor T6 includes the N-type transistor.

In an example embodiment, a threshold voltage range of the first transistor T1 is 0.5 volt to 1 volt. A threshold voltage range of the second transistor T2 is 0.5 volt to 1 volt. A threshold voltage range of the third transistor T3 is 0.5 volt to 1 volt. A threshold voltage range of the fourth transistor T4 is 0.5 volt to 1 volt. A threshold voltage range of the fifth transistor T5 is 0.5 volt to 1 volt. A threshold voltage range of the sixth transistor T6 is 0.5 volt to 1 volt.

Therefore, after the electrostatic charges are input to the power supply voltage node VDD, the first transistor T1 is loaded with a high-level voltage to enable the first transistor T1 to be conducted first. After the first transistor T1 is conducted, the second transistor T2 and the third transistor T3 are connected to a low-level voltage of the ground voltage node VSS to enable the second transistor T2 and the third transistor T3 to be conducted. After the second transistor T2 and the third transistor T3 are conducted, the fifth transistor T5 and the sixth transistor T6 are connected to the high-level voltage of the power supply voltage node VDD to enable the fifth transistor T5 and the sixth transistor T6 to be conducted. After the fifth transistor T5 and the sixth transistor T6 are conducted, the electrostatic charges are discharged at the ground voltage node VSS.

In the electrostatic discharge circuit, the first transistor T1, the second transistor T2, and the fifth transistor T5 form a loop with the power supply voltage node VDD. The first transistor T1, the third transistor T3, and the sixth transistor T6 form a loop with the ground voltage node VSS. The two loops can be paralleled to conduct the fifth transistor T5 and the sixth transistor T6, to enable the electrostatic charges to be discharged at the ground voltage node VSS. The two loops can be paralleled to conduct the fifth transistor and the sixth transistor, therefore, a response time of the fifth transistor and the sixth transistor can be shortened, a conduction speed of the electrostatic discharge circuit can be relatively fast, and the electrostatic discharge performance can be improved. In addition, the two loops can be paralleled, therefore an on-resistance of the electrostatic discharge circuit can be relatively small, a voltage drop of the electrostatic discharge circuit can be relatively small, and the fifth transistor T5 and the sixth transistor T6 can be conducted relatively fully, to increase a discharge capacity of the electrostatic discharge circuit.

Further, the electrostatic discharge circuit further includes the first capacitor C1 connected to the power supply voltage node VDD and the gate of the first transistor T1, the first resistor R1 connected to the power supply voltage node VDD and the drain of the first transistor T1, the second resistor R2 connected to the first capacitor C1, and the second capacitor C2 connected to the ground voltage node VSS. The source of the first transistor T1 is connected to the second resistor R2 and the second capacitor C2. Therefore, conduction of each of the two parallel loops only has a response time of one RC. Thus, the response speed of the electrostatic discharge circuit can be relatively fast, the on-resistance of the electrostatic discharge circuit can be relatively small, and the discharge capacity of the electrostatic discharge circuit can be increased, thereby improving the electrostatic discharge performance.

Figure 3:
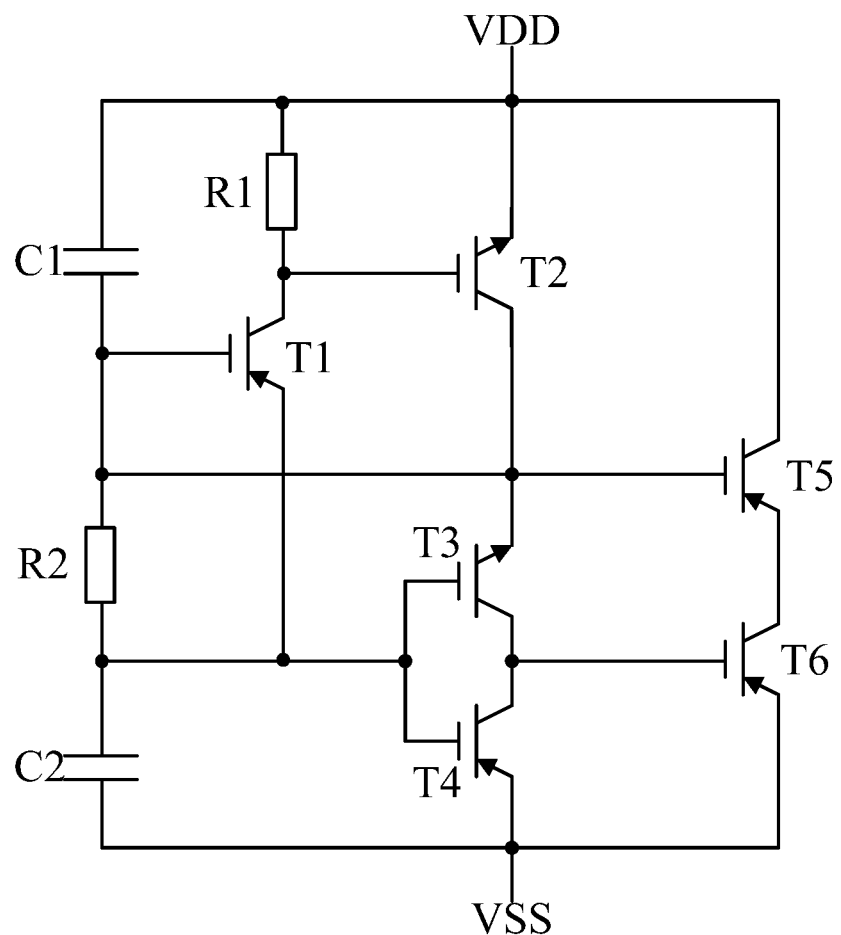
FIG. 3 is a schematic diagrams of an electrostatic discharge circuit according to another example embodiment of the present disclosure.

FIG. 3 is a schematic diagrams of an electrostatic discharge circuit according to another example embodiment of the present disclosure.

As shown in FIG. 3, the electrostatic discharge circuit includes a first transistor T1, a second transistor T2, a third transistor T3, a fourth transistor T4, a fifth transistor T5, and a sixth transistor T6.

A gate of the first transistor T1 is coupled to a power supply voltage node VDD. A drain of the first transistor T1 is coupled to the power supply voltage node VDD. A source of the first transistor T1 is coupled to a ground voltage node VSS.

A gate of the second transistor T2 is connected to the drain of the first transistor T1. A source of the second transistor T2 is connected to the power supply voltage node VDD.

A gate of the third transistor T3 and a gate of the fourth transistor T4 are connected to the source of the first transistor T1. A drain of the third transistor T3 is connected to a drain of the fourth transistor T4. A source of the third transistor T3 is connected to the drain of the second transistor T2. A source of the fourth transistor T4 is connected to the ground voltage node VSS.

The third transistor T3 and the fourth transistor T4 constitute an inverter. In an example embodiment, the fourth transistor T4 functions as a stabilizing circuit, to enable the electrostatic discharge circuit to be conducted in a case with a non-electrostatic input, thereby preventing the entire circuit from leaking.

A gate of the fifth transistor T5 is connected to the source of the third transistor T3 and the drain of the second transistor T2. A drain of the fifth transistor T5 is connected to the power supply voltage node VDD.

A gate of the sixth transistor T6 is connected to the drain of the third transistor T3 and the drain of the fourth transistor T4. A drain of the sixth transistor T6 is connected to the fifth transistor T5. A source of the sixth transistor T6 is connected to the ground voltage node VSS.

In an example embodiment, the gate of the fifth transistor T5 is also coupled to the power supply voltage node VDD.

The gate of the fifth transistor T5 is coupled with the power supply voltage node VDD, therefore the fifth transistor T5 can be conducted by a voltage of the power supply voltage node VDD, a conduction time of the fifth transistor T5 can be shortened, and a conduction efficiency of the electrostatic discharge circuit is improved.

In an example embodiment, the electrostatic discharge circuit further includes a first capacitor C1. One end of the first capacitor C1 is connected to the power supply voltage node VDD, another end of the first capacitor C1 is connected to the gate of the first transistor T1.

The first capacitor C1 is used to read a potential of the power supply voltage node VDD.

In an example embodiment, the electrostatic discharge circuit further includes a first resistor R1. One end of the first resistor R1 is connected to the power supply voltage node VDD, another end of the first resistor R1 is connected to the drain of the first transistor T1.

The first resistor R1 plays a protective role to prevent the first transistor T1 and the second transistor T2 from being easily broken down due to a relatively large voltage of the power supply voltage node VDD when the first transistor T1 and the second transistor T2 are directly connected to the power supply voltage node VDD.

The first transistor T1, the second transistor T2, and the fifth transistor T5 form a loop with the power supply voltage node VDD. The loop has a response time of the first resistor R1 and the first capacitor C1, that is, the response time of R1C1.

In an example embodiment, the electrostatic discharge circuit further includes a second resistor R2 and a second capacitor C2. One end of the second resistor R2 is connected to the first capacitor C1, another end of the second resistor R2 is connected to the gate of the third transistor T3 and the gate of the fourth transistor T4. One end of the second capacitor C2 is connected to the ground voltage node VSS, another end of the second capacitor C2 is connected to the second resistor R2.

The first transistor T1, the third transistor T3, and the sixth transistor T6 form a loop with the ground voltage node VSS. The loop has a response time of the second resistor R2 and the second capacitor C2, that is, the response time of R2C2.

In an example embodiment, the power supply voltage node VDD is an electrostatic input terminal. The ground node VSS is an electrostatic output terminal.

In an example embodiment, the first transistor T1 includes an N-type transistor. The second transistor T2 includes a P-type transistor. The third transistor T3 includes the P-type transistor. The fourth transistor T4 includes the N-type transistor. The fifth transistor T5 includes the N-type transistor. The sixth transistor T6 includes the N-type transistor.

Therefore, after the electrostatic charges are input to the power supply voltage node VDD, the first transistor T1 is loaded with a high-level voltage to enable the first transistor T1 to be conducted first. After the first transistor T1 is conducted, the second transistor T2 and the third transistor T3 are connected to a low-level voltage of the ground voltage node VSS to enable the second transistor T2 and the third transistor T3 to be conducted. After the second transistor T2 and the third transistor T3 are conducted, the fifth transistor T5 and the sixth transistor T6 are connected to the high-level voltage of the power supply voltage node VDD to enable the fifth transistor T5 and the sixth transistor T6 to be conducted. After the fifth transistor T5 and the sixth transistor T6 are conducted, the electrostatic charges are discharged at the ground voltage node VSS.

In the electrostatic discharge circuit, the first transistor T1, the second transistor T2, and the fifth transistor T5 form a loop with the power supply voltage node VDD. The first transistor T1, the third transistor T3, and the sixth transistor T6 form a loop with the ground voltage node VSS. The two loops can be paralleled to conduct the fifth transistor T5 and the sixth transistor T6, to enable the electrostatic charges to be discharged at the ground voltage node VSS. The two loops can be paralleled to conduct the fifth transistor and the sixth transistor, therefore, a response time of the fifth transistor and the sixth transistor can be shortened, a conduction speed of the electrostatic discharge circuit can be relatively fast, and the electrostatic discharge performance can be improved. In addition, the two loops can be paralleled, therefore an on-resistance of the electrostatic discharge circuit can be relatively small, a voltage drop of the electrostatic discharge circuit can be relatively small, and the fifth transistor T5 and the sixth transistor T6 can be conducted relatively fully, to increase a discharge capacity of the electrostatic discharge circuit.

Further, the electrostatic discharge circuit further includes the first capacitor C1 connected to the power supply voltage node VDD and the gate of the first transistor T1, the first resistor R1 connected to the power supply voltage node VDD and the drain of the first transistor T1, the second resistor R2 connected to the first capacitor C1, and the second capacitor C2 connected to the ground voltage node VSS. The source of the first transistor T1 is connected to the second resistor R2 and the second capacitor C2. Therefore, conduction of each of the two parallel loops only has a response time of one RC. Thus, the response speed of the electrostatic discharge circuit can be relatively fast, the on-resistance of the electrostatic discharge circuit can be relatively small, and the discharge capacity of the electrostatic discharge circuit can be increased, thereby improving the electrostatic discharge performance.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. An electrostatic discharge circuit comprising:
    a first transistor, a gate of the first transistor being coupled to a power supply voltage node, a drain of the first transistor being coupled to the power supply voltage node, and a source of the first transistor being coupled to a ground voltage node;
    a second transistor, a gate of the second transistor being connected to the drain of the first transistor, and a source of the second transistor being connected to the power supply voltage node;
    a third transistor, a gate of the third transistor being connected to the source of the first transistor, and a source of the third transistor being connected to the drain of the second transistor;
    a fourth transistor, a gate of the fourth transistor being connected to the source of the first transistor, a drain of the fourth transistor being connected to a drain of the third transistor, and a source of the fourth transistor being connected to the ground voltage node;
    a fifth transistor, a gate of the fifth transistor being connected to the source of the third transistor and the drain of the second transistor, and a drain of the fifth transistor being connected to the power supply voltage node; and
    a sixth transistor, a gate of the sixth transistor being connected to the drain of the third transistor and the drain of the fourth transistor, a drain of the sixth transistor being connected to the source of the fifth transistor, and a source of the sixth transistor being connected to the ground voltage node.

2. The electrostatic discharge circuit of claim 1, wherein the gate of the fifth transistor is further coupled to the power supply voltage node.

3. The electrostatic discharge circuit of claim 1, further comprising:
    a first capacitor, one end of the first capacitor being connected to the power supply voltage node, and another end of the first capacitor being connected to the gate of the first transistor.

4. The electrostatic discharge circuit of claim 1, further comprising:
    a first resistor, one end of the first resistor being connected to the power supply voltage node, and another end of the first resistor being connected to the drain of the first transistor.

5. The electrostatic discharge circuit of claim 3, further comprising:
    a second resistor, one end of the second resistor being connected to the first capacitor, and another end of the second resistor being connected to the gate of the third transistor and the gate of the fourth transistor.

6. The electrostatic discharge circuit of claim 5, further comprising:
    a second capacitor, one end of the second capacitor being connected to the ground voltage node, and another end of the second capacitor being connected to the second resistor.

7. The electrostatic discharge circuit of claim 1, wherein:
    the first transistor includes an N-type transistor;
    the second transistor includes a P-type transistor;
    the third transistor includes a P-type transistor;
    the fourth transistor includes an N-type transistor;
    the fifth transistor includes an N-type transistor; and
    the sixth transistor includes an N-type transistor.

8. The electrostatic discharge circuit of claim 7, wherein:
    a threshold voltage range of the first transistor is 0.5V to 1V;
    a threshold voltage range of the second transistor is 0.5V to 1V;
    a threshold voltage range of the third transistor is 0.5V to 1V;
    a threshold voltage range of the fourth transistor is 0.5V to 1V;
    a threshold voltage range of the fifth transistor is 0.5V to 1V; and
    a threshold voltage range of the sixth transistors is 0.5V to 1V.

9. The electrostatic discharge circuit of claim 1, wherein:
    the power supply voltage node is an electrostatic input terminal; and
    the ground node is an electrostatic output terminal.

10. The electrostatic discharge circuit of claim 1, wherein:
    the first transistor, the second transistor, the fifth transistor, and the power supply voltage node form a first loop;
    the first transistor, the third transistor, the sixth transistor, and the ground voltage node form a second loop; and
    the first loop and the second loop are paralleled to conduct the fifth transistor and the sixth transistor, to enable electrostatic charges to be discharged at the ground voltage node.

11. A method for configuring an electrostatic discharge circuit comprising:
    coupling a gate of a first transistor to a power supply voltage node, coupling a drain of the first transistor to the power supply voltage node, and coupling a source of the first transistor to a ground voltage node;
    connecting a gate of a second transistor to the drain of the first transistor, and connecting a source of the second transistor to the power supply voltage node;

connecting a gate of a third transistor to the source of the first transistor, and connecting a source of the third transistor to the drain of the second transistor;

connecting a gate of a fourth transistor to the source of the first transistor, connecting a drain of the fourth transistor to a drain of the third transistor, and connecting a source of the fourth transistor to the ground voltage node;

connecting a gate of a fifth transistor to the source of the third transistor and the drain of the second transistor, and connecting a drain of the fifth transistor to the power supply voltage node; and connecting a gate of a sixth transistor to the drain of the third transistor and the drain of the fourth transistor, connecting a drain of the sixth transistor to the source of the fifth transistor, and connecting a source of the sixth transistor to the ground voltage node.

12. The method of claim 11, further comprising:
coupling the gate of the fifth transistor to the power supply voltage node.

13. The method of claim 11, further comprising:
connecting one end of a first capacitor to the power supply voltage node, and connecting another end of the first capacitor to the gate of the first transistor.

14. The method of claim 11, further comprising:
connecting one end of a first resistor to the power supply voltage node, and connecting another end of the first resistor to the drain of the first transistor.

15. The method of claim 13, further comprising:
connecting one end of a second resistor to the first capacitor, and connecting another end of the second resistor to the gate of the third transistor and the gate of the fourth transistor.

16. The method of claim 15, further comprising:
connecting one end of a second capacitor to the ground voltage node, and connecting another end of the second capacitor to the second resistor.

17. The method of claim 11, wherein:
the first transistor includes an N-type transistor;
the second transistor includes a P-type transistor;
the third transistor includes a P-type transistor;
the fourth transistor includes an N-type transistor;
the fifth transistor includes an N-type transistor; and
the sixth transistor includes an N-type transistor.

18. The method of claim 17, wherein:
a threshold voltage range of the first transistor is 0.5V to 1V;
a threshold voltage range of the second transistor is 0.5V to 1V;
a threshold voltage range of the third transistor is 0.5V to 1V;
a threshold voltage range of the fourth transistor is 0.5V to 1V;
a threshold voltage range of the fifth transistor is 0.5V to 1V; and
a threshold voltage range of the sixth transistors is 0.5V to 1V.

19. The method of claim 11, wherein:
the power supply voltage node is an electrostatic input terminal; and
the ground node is an electrostatic output terminal.

20. The method of claim 11, wherein:
the first transistor, the second transistor, the fifth transistor, and the power supply voltage node form a first loop;
the first transistor, the third transistor, the sixth transistor, and the ground voltage node form a second loop; and
the first loop and the second loop are paralleled to conduct the fifth transistor and the sixth transistor, to enable electrostatic charges to be discharged at the ground voltage node.

* * * * *